United States Patent
Oh

(10) Patent No.: US 11,417,039 B2
(45) Date of Patent: Aug. 16, 2022

(54) METHOD TO PROVIDE DESIGN INFORMATION

(71) Applicant: CLO Virtual Fashion Inc., Seoul (KR)

(72) Inventor: Seungwoo Oh, Seoul (KR)

(73) Assignee: CLO VIRTUAL FASHION INC., Seoul (KR)

( * ) Notice: Subject to any disclaimer, the term of this patent is extended or adjusted under 35 U.S.C. 154(b) by 32 days.

(21) Appl. No.: 16/819,926

(22) Filed: Mar. 16, 2020

(65) Prior Publication Data
US 2021/0192814 A1    Jun. 24, 2021

(30) Foreign Application Priority Data
Dec. 20, 2019 (KR) .......................... 10-2019-0172432

(51) Int. Cl.
*G06T 11/60*  (2006.01)
(52) U.S. Cl.
CPC .......... *G06T 11/60* (2013.01); *G06T 2200/24* (2013.01); *G06T 2210/16* (2013.01)
(58) Field of Classification Search
CPC .. G06T 11/60; G06T 2200/24; G06T 2210/16
See application file for complete search history.

(56) References Cited

U.S. PATENT DOCUMENTS

| | | | | |
|---|---|---|---|---|
| 2004/0146221 A1* | 7/2004 | Siegel | ..................... | G06T 11/60 382/305 |
| 2007/0198118 A1* | 8/2007 | Lind | ..................... | A41H 3/007 700/138 |
| 2008/0028323 A1* | 1/2008 | Rosen | ..................... | G06Q 10/10 715/752 |
| 2013/0019182 A1 | 1/2013 | Gil et al. | | |
| 2014/0114620 A1* | 4/2014 | Grinspun | ................ | G06T 19/00 703/1 |
| 2015/0066189 A1* | 3/2015 | Mulligan | ........... | G06Q 30/0621 700/136 |
| 2018/0077987 A1* | 3/2018 | Ko | .......................... | G06T 19/20 |
| 2018/0081526 A1 | 3/2018 | Choi et al. | | |
| 2018/0285517 A1* | 10/2018 | Reichental | .............. | G06F 30/17 |
| 2019/0004688 A1 | 1/2019 | Bowen | | |

(Continued)

FOREIGN PATENT DOCUMENTS

| JP | 2018-529475 A | 10/2018 |
|---|---|---|
| JP | 2018529475 A | 10/2018 |

(Continued)

OTHER PUBLICATIONS

The Art of Retouching Studio, "Palettes & Navigation | Photoshop Beginner's Tutorial", Jun. 8, 2014, https://www.youtube.com/watch?v=kxe_OBElr_s (Year: 2014).*

(Continued)

*Primary Examiner* — Michelle L Sams
(74) *Attorney, Agent, or Firm* — Fenwick & West LLP

(57) ABSTRACT

Disclosed is a user interface including: a design image layer including a design image, and displaying a visual representation in one or more regions corresponding to a user selection input on the design image, in response to the user selection input in a selection layer; and a selection layer including one or more design data associated with the design image, and allowing a user selection input to the one or more design data.

25 Claims, 6 Drawing Sheets

(56) References Cited

U.S. PATENT DOCUMENTS

2019/0076125 A1   3/2019 Roger
2019/0272679 A1*  9/2019 Brodsky .......... G06F 30/20
2019/0340198 A1* 11/2019 Hamada .......... G06F 16/00

FOREIGN PATENT DOCUMENTS

| KR | 10-2014-0048934 A | 4/2014 |
| KR | 1020140048934 A | 4/2014 |
| KR | 10-1575446 B1 | 12/2015 |
| KR | 101784355 B1 | 9/2017 |
| KR | 10-1784355 B1 | 11/2017 |
| KR | 10-2018-0031260 A | 3/2018 |
| KR | 10-2011055 B1 | 8/2019 |
| KR | 10-2019-0131268 A | 11/2019 |
| WO | WO 2013/010155 A2 | 1/2013 |

OTHER PUBLICATIONS

MLC CAD Systems, "Solidworks MBD Annotation Views 101", Jan. 11, 2018, https://www.youtube.com/watch?v=oeAEJ4uZkv8 (Year: 2018).*
Techpacker, "Techpacker vs Excel: Creating tech packs the easy way," Teckpacker, Feb. 10, 2019, 29 pages [Online] [Retrieved from the internet] <URL: https://www.techpacker.com/blog/techpacker-vs-excel/>.
Korean Intellectual Property Office, Office Action, KR Patent Application No. 10-2019-0172432, dated Dec. 11, 2020, 14 pages.
Korean Intellectual Property Administration, Office Action, KR Patent Application No. 10-2021-0019662, dated Jun. 30, 2021, 12 pages.
youtube.com, "CLO 4.2 Version New Features Webinar (Korean)," Oct. 9, 2018, six pages, [Online] Retrieved from the Internet <URL: https://www.youtube.com/watch?v=U6HmpTvzzB8>.

* cited by examiner

METHOD TO PROVIDE DESIGN INFORMATION

CROSS-REFERENCE TO RELATED APPLICATIONS

This application claims priority to and the benefit of Republic of Korea Patent Application No. 10-2019-0172432 filed on Dec. 20, 2019, the entire contents of which are incorporated herein by reference.

TECHNICAL FIELD

The present disclosure relates to providing design information, and more particularly, to a method for providing a user interface for displaying design information.

BACKGROUND ART

In the conventional garment production practice, in order to deliver garment data to fabricate garments, design work is performed by preparing the design of the garment through handwriting or by direct delivery of a physical sample of a garment to a garment manufacture, which includes, for example, fabric, supplemental material, etc. However, the delivery of physical sample takes a long time. When photos of the garment is sent remotely, the garment data may not be accurately delivered to the manufacture. To address these issues, offline digitalizing of the garment data is recently being performed. However, when the digitalized design data is provided to a manufacture, it may be difficult for the manufacture to intuitively understand the garment data or perform operations on the data.

SUMMARY OF THE INVENTION

Embodiments relate to designing of an article by displaying, an image of a virtual version of the article in a design image layer and displaying design data items indicating types or configurations of items that form part of a physical version of the article in a selection layer. The article includes a plurality of regions. After a user selection input indicating selection of one or more of the items by a user is received, one or more of the regions corresponding to the selected one or more of the items are displayed in a distinctive manner.

In one or more embodiments, the design image layer and the selection layer are different layers. The selection layer is moved relative to the design image layer in response to a user movement input.

In one or more embodiments, at least a part of a region in the selection layer is overlaid on the the design image layer in a transparent manner to render the design image layer visible.

In one or more embodiments, one or more categories of the items in a category region of the selection layer are displayed. The user selection input identifies the one or more categories to select the items. A design data region displaying the design data items in a design data region of the selection layer is displayed.

In one or more embodiments, the category region and the design data region are displayed alongside each other.

In one or more embodiments, the category object includes at least one of a pattern category object, a material category object, a supplemental material category object, or a measure category object.

In one or more embodiments, the design data region displays at least one of identification data identifying the one or more design data or descriptive data describing the one or more design data items.

In one or more embodiments, the descriptive data includes at least one of an image or a text describing a corresponding design data item.

In one or more embodiments, an identification data or sub design image data is displayed. The identification data identifies a design data on the image of the virtual version of the article. Sub design image data displays a region corresponding to the design data item on the the image of the virtual version of the article.

In one or more embodiments, the one or more of the regions corresponding to the selected one or more of the items are less transparent compared to regions other than the one or more of the regions.

In one or more embodiments, an outline of the one or more regions corresponding to the selected one or more items are displayed.

In one or more embodiments, the one or more regions are displayed in a color different from regions other than the one or more regions.

In one or more embodiments, an annotation layer is overlaid on the design image layer or the selection layer to enable the user to add one or more annotations on the displayed image of the virtual version of the article or a design data item in the selection layer.

In one or more embodiments, after receiving a user adjustment input, a location, an angle, or a size of the image of the virtual version of the article is changed.

In one or more embodiments, a design image change layer overlaid on the design image layer is displayed. A user design input representing change of a feature related to the virtual version of the article is received. In response to receiving the user design input, the displayed image of the image of the virtual version of the article is updated.

In one or more embodiments, the virtual version of the article includes includes one or more sub-objects selectable by the user. A sub-object user input selecting one of the one or more sub-objects is received. One or more design data items corresponding to the selected sub-object are displayed in the selection layer.

In one or more embodiments, a portion of the selection layer with annotation is displayed in a different manner compared to another portion of the selection layer without annotation.

DETAILED DESCRIPTION

Various exemplary embodiments will now be described with reference to drawings. In the present specification, various descriptions are presented to provide appreciation of the present disclosure. However, it is apparent that the exemplary embodiments can be executed without the specific description.

A layer described herein refers to a level at which an object or image may be placed in digital graphics. Two or more layers may be displayed simultaneously in an overlaid manner where one layer is overlaid onto another layer. The upper one of the two or more layers may be partially semi-transparent to render the lower one of the two or more layers visible. Each of the layers may include one or more regions.

An object described herein refers to a graphical element that may be placed in a layer. The object may include, among others, a picture, a symbol, or text. Some of the objects may be used for receiving a user input representing a user's selection.

Figure 1:
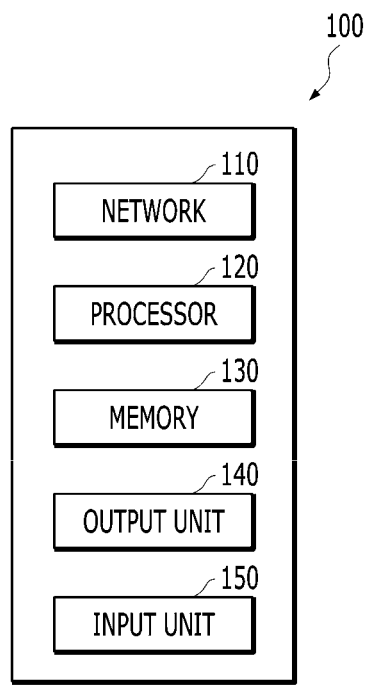
FIG. 1 is a block diagram of a computing device for performing an operation for providing a user interface for displaying design information according to an exemplary embodiment of the present disclosure.

FIG. 1 is a block diagram of a computing device for performing an operation for providing a user interface for displaying design information according to an exemplary embodiment of the present disclosure.

A computing device 100 for performing an operation for providing a user interface for displaying design information according to an exemplary embodiment of the present disclosure may include a network unit 110, a processor 120, a memory 130, an output unit 140, and an input unit 150.

According to exemplary embodiments of the present disclosure, computing device 100 may include a personal computer (PC), a notebook, a mobile terminal, a smart phone, a tablet PC, and the like and include all kinds of terminals which may access a wired/wireless network.

Network unit 110 may transmit and receive data to and from other computing devices, servers, and the like to provide the user interface for displaying design information according to an exemplary embodiment of the present disclosure.

According to an exemplary embodiment of the present disclosure, network unit 110 may operate based on arbitrary type wired/wireless communication technology which is currently used and implemented, such as local area (short range), long range, wired, and wireless.

According to an exemplary embodiment of the present disclosure, the processor 120 may be constituted of one or more cores and may include processors for providing the user interface for displaying the design information, which include a central processing unit (CPU), a general purpose graphics processing unit (GPGPU), a tensor processing unit (TPU), and the like of a computing device. The processor 120 may provide the user interface which reads a computer program stored in the memory 130 and displays the design information according to an exemplary embodiment of the present disclosure. At least one of the CPU, the GPGPU, and the TPU of the processor 120 may provide or generate the user interface for displaying the design information. For example, a user interface may be provided, in which both the CPU and the GPGPU display the design information. Furthermore, a user interface may be provided, which displays the design information by using processors of a plurality of computing devices together in an exemplary embodiment of the present disclosure. Furthermore, the computer program executed in the computing device according to an exemplary embodiment of the present disclosure may be a CPU, GPGPU, or TPU executable program.

The memory 130 according to an exemplary embodiment of the present disclosure may store any type of information created or determined by the processor 120 or any type of information received by the network unit 110.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory or the like), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk. The computing device 100 may operate in connection with a web storage performing a storing function of the memory 130 on the Internet. The description of the memory is merely an example and the present disclosure is not limited thereto.

The output unit 140 according to an exemplary embodiment of the present disclosure may display any user interface (UI) for providing user selection based design information. The output unit 140 may display the user interface illustrated in FIGS. 2 to 4. Hereinafter, user interfaces illustrated and described below are only examples and the present disclosure is not limited thereto.

The output unit 140 according to an exemplary embodiment of the present disclosure may output any type of information created or determined by the processor 120 or any type of information received by the network unit 110.

The output unit 140 according to an exemplary embodiment of the present disclosure may include at least one of: a liquid crystal display (LCD), a thin film transistor-liquid crystal display (TFT LCD), an organic light-emitting diode (OLED), a flexible display, or a 3D display. Some display modules among them may be configured as a transparent or light transmissive type to view the outside through the displays. This may be called a transparent display module, and a representative example of the transparent display module includes a transparent OLED (TOLED) and the like.

User input may be received through the input unit 150 according to an exemplary embodiment of the present disclosure. The input unit 150 according to an exemplary embodiment of the present disclosure may include keys and/or buttons for receiving the user input. A computer program for providing the user selection based design information according to the exemplary embodiment of the present disclosure may be executed according to the user input through the input unit 150.

The input unit 150 according to an exemplary embodiment of the present disclosure receives a signal by sensing a button operation or a touch input of the user or receives a speech or a motion of the user through a camera or a microphone to convert the received signal, speech, or motion into an input signal. To this end, speech recognition technologies or motion recognition technologies may be used.

The input unit 150 according to an exemplary embodiment of the present disclosure may be implemented as an external input equipment connected to the computing device 100. For example, the input equipment may be at least one of: a touch pad, a touch pen, a keyboard, or a mouse for receiving the user input, but this is merely an example and the present disclosure is not limited thereto.

The input unit 150 according to an exemplary embodiment of the present disclosure may recognize user touch input. The input unit 150 according to an exemplary embodiment of the present disclosure may be the same component as the output unit 140. The input unit 150 may be configured as a touch screen implemented to receive selection input of the user. The touch screen may adopt any one scheme of a contact type capacitive scheme, an infrared light detection scheme, a surface ultrasonic wave (SAW) scheme, a piezo-electric scheme, or a resistance film scheme. A detailed description of the touch screen is merely an example according to an exemplary embodiment of the present disclosure and various touch screen panels may be adopted in the computing device 100. The input unit 150 configured as the touch screen may include a touch sensor. The touch sensor may be configured to convert a change in pressure applied to a specific portion of the input unit 150 or capacitance generated at a specific portion of the input unit 150 into an electrical input signal. The touch sensor may be configured to detect touch pressure as well as a touched position and area. When there is a touch input for the touch sensor, a signal(s) corresponding to the touch input is(are) sent to a touch controller. The touch controller processes the signal(s) and thereafter, transmits data corresponding thereto to the processor 120. As a result, the processor 120 may recognize which area of the input unit 150 is touched and the like.

In an exemplary embodiment of the present disclosure, a server may include other components for performing a server environment of the server. The server may include all arbitrary types of devices. The server as a digital device may be a digital device with a calculation capability, which has a processor installed therein and a memory, such as a laptop computer, a notebook computer, a desktop computer, a web pad, or a mobile phone.

A server (not illustrated) performing an operation for providing the user interface to the user terminal for displaying the design information according to an exemplary embodiment of the present disclosure may include a network unit, a processor, and a memory.

The server may generate the user interface according to an exemplary embodiment of the present disclosure. The server may be a computing system providing information to a client (e.g., user terminal) through a network. The server may transmit the generated user interface to the user terminal. In this case, the user terminal may be an arbitrary type of the computing device 100 which may access the server. The processor of the server may transmit the user interface to the user terminal through the network unit. The server according to an exemplary embodiment of the present disclosure may be, for example, a cloud server. The server may be a web server that processes a service. A type of the server described above is merely an example and the present disclosure is not limited thereto.

The network unit, the processor, and the memory included in the server according to an exemplary embodiment of the present disclosure may play the same roles or be configured similarly as the network unit 110, the processor 120, and the memory 130 included in the computing device 100.

Figure 2:
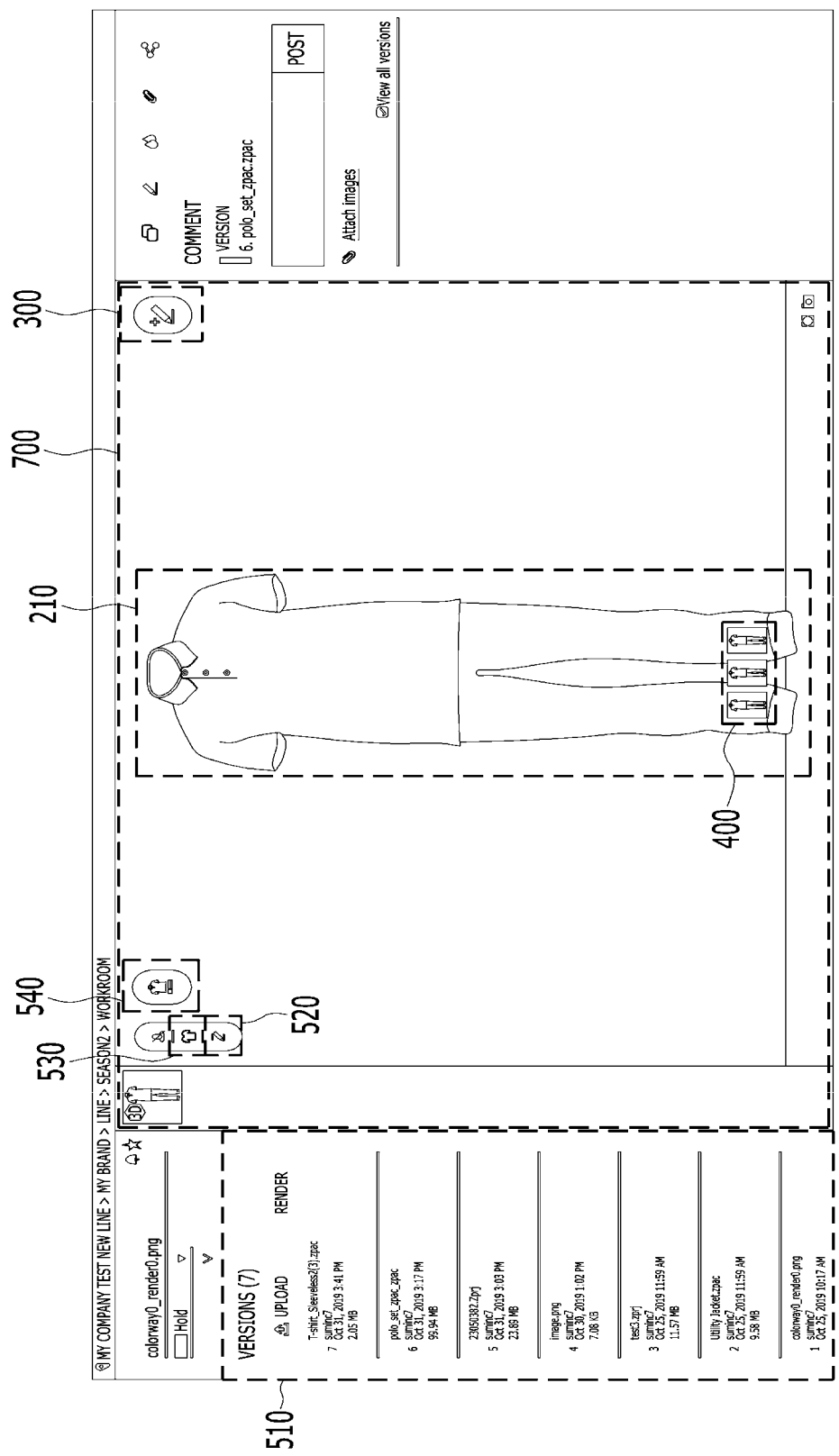
FIG. 2 is a user interface diagram illustrating a design file list layer and a design image layer, according to one embodiment of the present disclosure.

FIG. 2 is a user interface diagram illustrating a design file list layer 510 and a design image layer 700, according to one embodiment of the present disclosure. The design information may be information on a designed article created by a user. The designed article may include, but not limited to, garment, bedding, doll, accessories and miscellaneous items.

The processor 120 may receive design files including a design image and one or more design data items associated with the design image through the network unit 110. The processor 120 may display a design file list for design files that may be selected by the user. The user interface may include layer 510 related to the design file list. The layer related to the design file list may be placed alongside design image layer 700. The layer 510 related to the design file list may display a design file with a matching annotation and a design file without a matching annotation in a different manner. For example, there may be an annotation input to at least one of the design image (also referred to herein as "virtual image of a virtual version of an article") or design data items included in design file 1 and there may be no annotation input to design file 2. Since design file 1 and design file 2 have different annotations, layer 510 related to the design file list may display design file 1 and design file 2 in a different manner. For example, a design file with a corresponding annotation may be displayed with a blue object while another design file without a corresponding annotation may be displayed with a yellow object.

The design image may be an image of virtual version of the designed article. In the example of FIG. 2, the design image represents a gray jacket and a pair of jeans.

A design data item refers to data indicating the configuration of physical items that form part of a physical version of the article that corresponds to the design image. A physical version of the article may be made of various physical items. The design data items indicate the types and/or configuration of these various physical items. The design data item may include data items related to at least one of: a pattern, a material, a supplemental material of the article, or a measure for each of the pattern, the material, and the supplemental material required for generating the article. The pattern may refer to defined cutting of at least some parts forming the article. For example, the pattern may indicate flat cutting for a front, a rear, a sleeve, and other parts forming a T-shirt. The material may refer to a raw material forming the article. For example, the material may indicate the use of cotton, wool, velvet, and etc., in the case of the garment. The supplemental material may be a material to supplement the raw material. For example, the material primarily used for fabricating the garment may be fabric and the supplemental material may be a button, a logo, a zipper, and etc. The measure may be a value for describing a dimension of the material or the supplemental material of the article. For example, the measure may be a length of each corner of the pattern, a diameter of the button, and etc. For example, the design data item may be data related to four patterns constituting the T-shirt, a material configuring each part of the T-shirt, the button and the log attached to the T-shirt, and the size or length for each of the pattern, the material, and the button and the logo.

The design file may be a file including the design image and one or more design data items associated with the design image. The design file may be a file including information regarding designing the article using an online program by designers (e.g., a garment designer). The information regarding designing of the article may include the design image and the design data items. The design file may include one or more design images and one or more design data items corresponding to one or more design images. For example, design file 1 may be a file for a jacket. Design file 1 may include garment images for one or more jackets configured by one or more colors or materials. Furthermore, design file 1 may include one or more design data items corresponding to the garment images for one or more jackets respectively. Design file 2 may be the file for the T-shirt.

The processor 120 may receive the design files through the network unit 110. Alternatively, the processor 120 may read the design files stored in the memory 130. The design file may include data generated through an article design program.

The processor 120 may display at least one of: the design image or the design data items corresponding to the design file selected by the user among displayed design files. The processor 120 may display the design image on a design image layer 700. The design image layer 700 may include the design image. The processor 120 may display the design data items on a selection layer 220. The selection layer 220 may include the design data items. For example, the processor 120 may display design file 1 and design file 2. The processor 120 may display at least one of: the design image or the design data items for design file 1 selected by a user selection input. For example, in response to the user selection input indicating the design file included in the layer 510 among files listed in the design file list, at least one layer of the design image layer 700 and the selection layer 220 may further include at least one of: the design image or the design data items associated with the selected design file. The processor 120 may display the design file selected by the user and the remaining design files of the design file list in a different manner. For example, only the design file selected by the user may be marked with a dark color while the remaining design files may be marked with a light color.

The processor 120 may display at least one of: a design image display object 530, a design data display object 540, or an annotation display object 520. The design image layer 700 may include at least one of: the design image display object 530, the design data display object 540, or the annotation display object 520.

The processor 120 may display at least one design image 210 of one or more design images included in the design file in response to the user selection input to the design image display object 530. In response to the user selection input to the design image display object 530, the design image layer 700 may further include the design image 210. The design image display object 530 may be a display object displaying the design image. When the processor 120 receives the user selection input to the design image display object 530 in a state in which the design image is displayed, the processor 120 may not allow the design image to be displayed. The processor 120 may delete the design image 210 included in the design image layer 700 in response to the use selection input to the design image display object 530 in the state in which the design image 210 is displayed. In other words, the user input to the design image display object 530 may operate like a display/non-display switch for the design image.

The design file may include two or more design images. The processor 120 may display one design image designated by default in advance among two or more design images in response to a user design input to the design image display object 530. The design image layer 700 may further include one design image designed by default in advance among two or more design images in response to the user design input to the design image display object 530. Alternatively, the processor 120 may display one arbitrary design image among two or more design images in response to the user design input to the design image display object 530. The design image layer 700 may further include one arbitrary design image among two or more design images in response to the user design input to the design image display object 530.

The design image included in the design file may be a two-dimensional image or a three-dimensional image. The processor 120 may adjust and display at least one of: location, angle, or size where the design image is displayed in response to a user adjustment input to the design image.

The user adjustment input may be a user input received through at least one of the output unit 140 or the input unit 150. For example, the user adjustment input may be an input through a mouse or a touch sensor used as the input unit 150.

The processor 120 may move a design image displayed at a first location to a second location and display the moved design image in response to a user adjustment input. The design image layer 700 may further include the design image moved from the first location to the second location in response to the user adjustment input. For example, the user adjustment input may be a click on the design image displayed at the first location and a drag input to the second location.

The processor 120 may rotate the design image displayed at a first angle to be displayed at a second angle in response to the user adjustment input. The design image layer 700 may further include the design image rotated at the second angle from the first angle in response to the user adjustment input. For example, according to the user adjustment input to the design image 210 displayed at the first angle, the processor 120 may rotate and display the design image so as to view a rear surface of the design image. For example, when the user adjustment input is a click on the design image 210 and a drag input in a bottom right direction, the processor 120 may rotate and display the design image to view a right shoulder part of the design image.

The processor 120 may enlarge or reduce a design image displayed with a first size to a second size and display the enlarged or reduced design image in response to the user adjustment input. The design image layer 700 may further include the design image enlarged or reduced from the first size to the second size in response to the user adjustment input. The user adjustment input may be input through a mouse wheel.

When there are two or more design images included in the design file, the processor 120 may display the design image change layer 400 changing the display design image. The user interface may further include the design image change layer 400. The processor 120 may display the design image change layer 400 allowing change of a feature related to the design image when a user design input is received. The design image change layer 400 may include a display object allowing the user selection input to change the feature related to the design image. The feature related to the design image may include at least one of: color, material, or texture of the design image. For example, the jacket design image included in design file 1 may include three colors. The processor 120 may display the design image change layer 400 including display objects of respective design images of a jacket having three colors. For example, the design image included in design file 1 may be matched with two or more materials. For example, the material matched with the design image may be velvet, wool, denim, cotton, etc. For example, the design image included in design file 1 may be matched with two or more textures. The texture may be associated with a roughness degree of the article (i.e., the designed garment in this example), a softness degree of the article, a weaving degree of the material, and etc. For example, the design image included in design file 1 may be matched with 30 combed yarn and 40 combed yarn.

The processor 120 may change and display the feature of the design image in response to the user design input in the image change layer 400. The design image layer 700 may further include the design image of which the feature is changed in response to the user design input in the image change layer 400. The processor 120 may display a design image related to the color or material corresponding to the display object according to the user design input.

The processor 120 may display design data items corresponding to the design image in response to a user selection input to the design data display object 540. The selection layer 220 may be displayed in the user interface in response to the user selection input to the design data display object 540. The design data display object 540 may be a display object displaying the design data items corresponding to the design image. When the processor 120 receives the user selection input to the design data display object 540 when the design data items is displayed, the processor 120 may allow the design data items not to be displayed. In other words, the user input to the design data display object 540 may operate as a display/non-display switch for the design data items. A method for displaying the design data items will be described below with reference to FIG. 3.

The processor 120 may display one or more annotations corresponding to at least one of: the design image or the design data items in response to receiving a user selection input to the annotation display object 520. At least one of the design image layer 700 or the selection layer 220 may further include one or more annotations in response to the user selection input to the annotation display object 520. The annotation display object 520 may be a display object displaying annotations stored in response to at least one of: the design image or the design data items. The annotation may be displayed simultaneously with the design image or the design data items. The annotation may be included in a layer different from a layer including the design image or a layer including the design data items. When the processor 120 receives the user selection input to the annotation display object 520 when the annotation is displayed, the processor 120 may allow the annotation not to be displayed. In other words, the user input for the annotation display object 520 may operate as a display/non-display switch for the annotation.

The processor 120 may display an annotation input object 300. The design image layer 700 may further include the annotation input object 300. The annotation input object 300 may be a display object allowing an annotation input of the user. The processor 120 may display an annotation layer 310 in response to the user selection input to the annotation input object 300. The user interface may further include an annotation layer 310 that displays annotation input object 300 in response to receiving user input to the annotation input object 300. The annotation will be described below with reference to FIG. 4.

Figure 3:
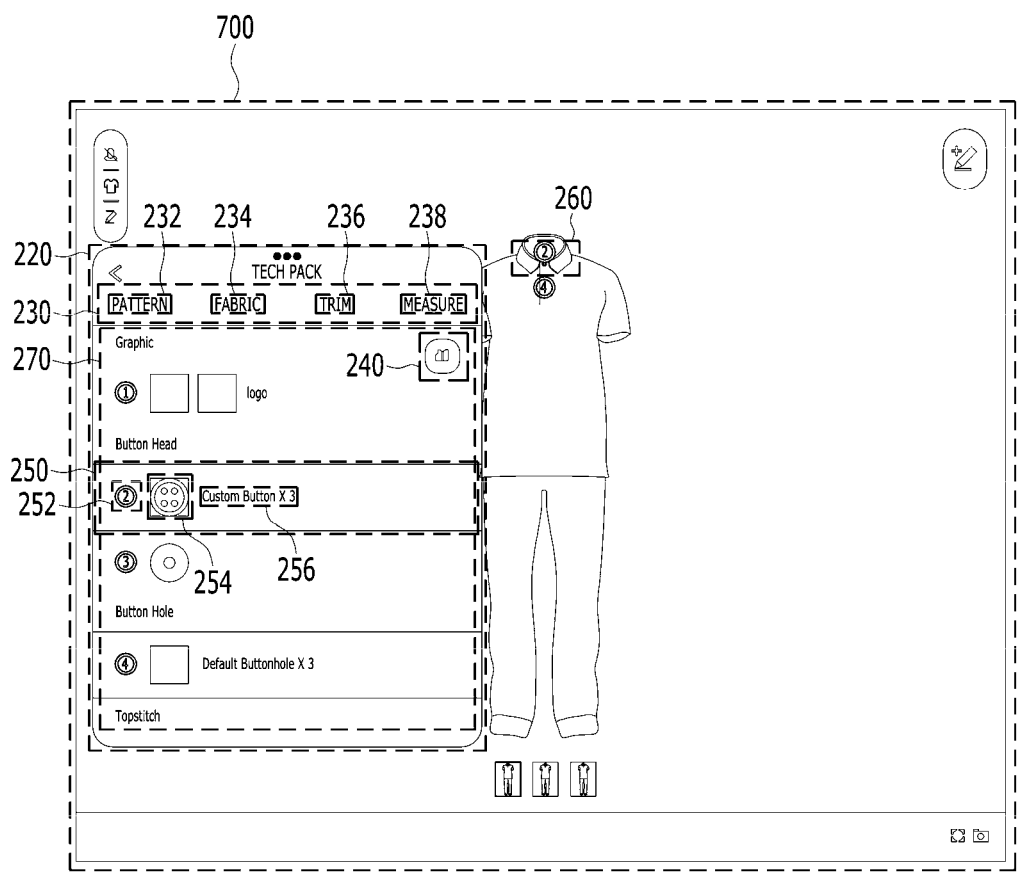
FIG. 3 is a user interface diagram illustrating a selection layer overlaid on the design image layer, according to one embodiment of the present disclosure.

FIG. 3 is a user interface diagram illustrating a selection layer 220 overlaid on the design image layer 700, according to one embodiment of the present disclosure. The processor 120 may display the design image and one or more design data items associated with the design image. The user interface may include the design image layer 700 including the design image. The user interface may include the selection layer 220 including the design data items.

The processor 120 may display the selection layer 220. The user interface may further include the selection layer 220. The selection layer 220 may be a layer displaying the design data items. The selection layer 220 may be a layer allowing the user selection input to one or more design data items.

The design image layer 700 and the selection layer 220 may be different layers. In one embodiment, the selection layer 220 is overlaid on the design image layer 700. The selection layer 220 may have a smaller size than the design image layer 700. The selection layer 220 may move independently of the design image layer 700 in response to the user input. The size of the selection layer 220 may be adjusted in response to the user input.

At least a part of a region included in the selection layer 220 is displayed with transparency set equal to or more than a predetermined threshold. At least a part of a region included in the selection layer 220 may be a region except for a region including one or more objects included in the selection layer 220. In other words, a part except for information which needs to be viewed by the user, which is included in the selection layer 220 may be displayed in a semi-transparent manner. At least a part of a region of the selection layer 220 is displayed with transparency set to be high and as a result, even when some parts of the design images included in the selection layer 220 and the design image layer 700 are displayed simultaneously, the design image is visible. At least a part of a region of the selection layer 220 is displayed with transparency set to be high, and as a result, the user can experience an enhanced level of convenience when examining the design image and the design data items.

The selection layer 220 may include a category region 230 and a design data region 270. The category region 230 and the design data region 270 included in the selection layer 220 may be disposed alongside each other. In one or more embodiments, the two regions are disposed adjacent to each other. The two regions may be disposed so that a predetermined distance between the two regions is maintained. At least partial regions included in the category region 230 and the design data region 270 respectively may be disposed adjacent to each other. The category region 230 and the design data region 270 included in the selection layer 220 may be disposed alongside each other vertically or horizontally. The category region 230 may be disposed on the top of the selection layer 220. The design data region 270 may be disposed on the bottom of the selection layer 220. The user may determine a category through the category region 230 and identify data associated with the category in the design data region 270 disposed alongside on the bottom of the category region 230. The category region 230 and the design data region 270 are disposed alongside each other to enhance intuitive understanding of the user interface.

The category region 230 may include one or more category objects that can be selected by the user to display corresponding detailed information of a category object in the design data region 270. The category objects may include various items that make up the article as represented by the design image 210. In the example of FIG. 3, such category objects include: pattern, fabric, trim and measure, each of which is shown as a pattern category object 232, a material category object 234, a supplemental material 236 and a measure category object 238.

The processor 120 may receive the user selection input to one category object included in the category region 230. The processor 120 may display one category object corresponding to the user selection input among one or more category objects included in the category region 230 in a manner different from the remaining category objects. The selection layer 220 may include display objects that differently display one category object corresponding to the user selection input and the remaining category objects. For example, the processor 120 may mark the category object corresponding to the user selection input with a white color while the remaining category objects are marked with a grey color.

The design data region 270 may include one or more design data item 250 corresponding to the category object according to the user selection input. Each of one or more design data item 250 included in the design data region 270 may be a user selectable display object. The processor 120 may display a design data item selected via the user selection input in a manner different from the remaining design data items. The design data region 270 may include a display object that differently displays the design data item corresponding to the user selection input and the remaining design data items. For example, the processor 120 may display background of the design data items in a different manner—a dark background is displayed for a design data item selected by the user while a light background is displayed for the remaining design data items.

The design data region 270 may include one or more design data items 250. The design data region 270 may include identification data 252, and descriptive data 254 and 256 for each of one or more design data items 250.

The identification data 252 may be data identifying one or more design data items. For example, the identification data 252 may be marked with a number, a text, or a color. For example, one or more respective design data item may correspond to at least one of: different numbers, texts, or colors. For example, one or more respective design data items may correspond to different numbers. The design data region 270 may include design data items aligned according to the identification data 252. The design data region 270 may include design data items aligned according to a number in ascending order, a number in descending order, an alphabetic order, and a color code order, for instance.

The descriptive data 254 and 256 may be data describing one or more design data items. The descriptive data may include at least one of: an image 254 or a text 256 describing the design data items. The descriptive data may be a display object associated with at least one of: image 254 or text 256 describing the design data items. The image 254 describing the design data items may include, for example, a pattern image, a material image, a supplemental material image and the like. The text 256 describing the design data items may include, for example, a pattern location, a material name, a supplemental material name and the like.

The descriptive data 254 may include a three-dimensional image or video describing the design data items. The descriptive data 254 may be an image expressing at least a part of the design image corresponding to the design data items three-dimensionally. The descriptive data 254 may be a video related to a case where at least a part of the design image corresponds to the design data item moves. For example, when the design data item is data related to the supplemental material, the descriptive data 254 may be data displaying the supplemental material three-dimensionally. For example, the design data item may be data related to the button. The descriptive data may include an image displaying the button three-dimensionally. When the design data item is data related to the material, the descriptive data 254 may be an image in which the fabric of the corresponding material is blown in the wind. For example, the image may have a length of 2 seconds and the corresponding image may be repeated and displayed as the descriptive data 254.

The design data region 270 may include one or more design data items grouped for each sub category. The sub category may group one or more design data items which belong to the same category having the same sub attribute according to a criterion. For example, one or more design data items which belong to the same supplemental material category may be grouped in the same sub category for each of the button, a stitch, and a logo. The processor 120 may display a sub category name in the design data region 270. The design data region 270 may include the sub category name. The processor 120 may display one or more design data items included in the sub category below the sub category name of the design data region 270. One or more design data items included in the sub category may be included below the sub category name of the design data region 270.

The selection layer 220 may display design data items with corresponding annotations in a manner different from design data items without corresponding annotations. For example, when there is an annotation generated to correspond to the design data item or when there is an annotation generated for at least a part of a region of the design image correspond to the design data item, the corresponding design data item may be displayed in a manner different from another design data item. For example, when there is a corresponding annotation, a blue square object may be separately displayed in the corresponding design data item or a background color may be displayed in a different manner. The processor 120 may receive a user selection input to at least one design data item included in the selection layer 220. The processor 120 may display design data item corresponding to the user selection input in a manner different from the remaining design data items. The selection layer 220 may include a display object displaying the design data item corresponding to the user selection input in a manner different from the remaining design data items.

The processor 120 may display on the design image a visual representation 260 in one or more regions corresponding to the user selection input in response to the user selection input to the design data item. The design image layer 700 may further include a design image where the visual representation 260 in one or more regions is displayed in response to the user selection input to the design data items included in the selection layer 220.

The visual representation 260 may display one or more regions of the design image corresponding to the user selection input in a manner different from other regions of the design image.

The visual representation 260 may include sub design image data displaying a region corresponding to the design data item. The processor 120 may display the region corresponding to the design data item according to the user selection input on the design image. The sub design image data may be a display for the region corresponding to the design data item.

The visual representation 260 may include an outline of one or more regions of the design image corresponding to the user selection input. The outline may be displayed with a color having high visibility, for example. The processor 120 displays the outline with the color with high visibility to differently display a region corresponding to the design data item selected by the user and other regions. The detailed description of the visual representation is merely an example and the present disclosure is not limited thereto.

The visual representation 260 may visually distinguish one or more regions to the other regions by increasing and displaying transparency of the other regions of the design image. The processor 120 may display the design image by setting transparency of all regions of the design image to the same level until the user selects the design data item. When the user selects at least one design data item, the processor

120 may display the design image by setting transparency of the region corresponding to the design data item and the other regions differently. For example, the processor 120 may display one region on the design image corresponding to the design data item selected by the user opaquely and display the remaining regions semi-transparently. The detailed description of the visual representation is merely an example and the present disclosure is not limited thereto.

The visual representation 260 may use for instance, color, material and etc. as a distinguisher to discern the region corresponding to the user selection input from the other regions. However, this is merely an example and the present disclosure is not limited thereto. The visual representation 260 may display different colors for the region corresponding to the user selection input from the other regions. The visual representation 260 may display the region corresponding to the user selection input with a color of high visibility. The detailed description of the visual representation is merely an example and the present disclosure is not limited thereto.

The visual representation 260 may include identification data identifying the design data item. The processor 120 may display identification data in the region corresponding to the design data item according to the user selection input or on the periphery of the region. Even when the user selects two or more design data items, the processor 120 may display the identification data so that parts corresponding to two or more design data items respectively is distinguishable on the design image. The identification data included in the design image layer 700 and the identification data included in the selection layer 220 may be objects including the corresponding visual representation. The object including the corresponding visual representation may be an object which allows the user to recognize the corresponding display as the shape, the texture, or the color of the object is similar. The corresponding visual representation may include the same visual representation, a similar visual representation, and a visual representation in which at least a part is the same or similar. For example, the identification data included in the design image layer 700 and the identification data included in the selection layer 220 may be objects including the same or similar shape or the same or similar color. For example, the identification data included in the design image layer 700 and the identification data included in the selection layer 220 may be objects including the same number or objects including the same color. The detailed description of the identification data is merely an example, and the present disclosure is not limited thereto. For example, the processor 120 may receive user selection inputs to design data items #2 and #4 respectively. The processor 120 may display identification data of "2" and "4" in respective regions so as to distinguish regions corresponding to two design data items on the design image. The identification data on the design image included in the design image layer 700 and the identification data included in the selection layer 220 are displayed as objects including the corresponding visual representation and as a result, the user may intuitively perceive which part of the article (e.g., garment) the identification data is related. Intuitively understanding of the user interface may be enhanced through the visual representation according to the present disclosure.

The processor 120 may display on the design image a visual representation 260 in one or more regions corresponding to the user selection input in response to the user selection input for the design data items. The processor 120 may display two or more visual representations 260 on the design image. Two or more visual representations 260 may include, for example, a visual representation displaying the other region of the design image by increasing the level of transparency for the other region and a visual representation for the identification data identifying the design data items. Two or more visual representations 260 may be displayed on the design image simultaneously or sequentially. For example, in response to the user selection input to the design data items, the visual representation displaying the other region of the design image by increasing the transparency for the other region of the design image may be primarily generated on the design image and the visual representation for the identification data identifying the design data items may be secondarily generated on the design image. The processor 120 may generate a representation for distinguishing one region from the other regions on the design image. The representation is selected and input by the user among two or more visual representations stored in the memory 130. The visual representation displayed on the design image may be generated by a method selected by the user.

According to an exemplary embodiment of the present disclosure, the design image 210 may include one or more design image sub-objects allowing a sub-object user input. The design image sub-object may be a display object allowing the sub-object user input to a part of a region of the design image 210. The design image sub-object may be a region with a matching design data items among one or more regions included in the design image 210. For example, the design image sub-object may be an object associated with the pattern, the supplemental material and etc. included in the design image.

In response to the user selection input related to the design image 210, the selection layer 220 may display the visual representation corresponding to the user selection input on the design data item. The selection layer 220 may display the visual representation related to one or more design data items corresponding to the user selection input related to the design image sub-object in the design image layer. For example, the design image sub-object selected by the user may be a display object related to a button supplemental material and the selection layer 220 may display the visual representation in the design data item related to the button supplemental material included in the selection layer 220 in response to the user selection input.

The design image layer 700 may display the visual representation for the design image sub-object selected and input by the user. The selection layer 220 may display the visual representation for the design data item corresponding to the design image sub-object. The visual representation displayed in the design image layer 700 and the visual representation displayed in the selection layer 220 may be corresponding visual representations. For example, when an annotation display of the design image sub-object selected by the user is generated with the color yellow, the annotation display is generated also with the color yellow even for a corresponding design data item, and as a result, the corresponding visual representation may be generated in each layer.

When the user wants to know detailed design data corresponding to the design image while viewing the design image, the user may click on a region on of the design image. When the user clicks on one specific region of the design image, a corresponding design data item is displayed in the selection layer, and as a result, the user may conveniently identify a detailed supplemental material, measure, material and etc. for creating the design of the part corresponding to the specific region.

The processor 120 may display a development view display object 240. The design image layer 700 may include the development view display object 240. The development view display object 240 may be a display object displaying a development view including one or more patterns. The development view refers to a drawing laying out of the display object 240 two dimensionally. The processor 120 may display a development view for one or more patterns generating a design corresponding to the design image in response to a user selection input to the development view display object 240. The user interface may further include a development view display layer in response to the user selection input to the development view display object 240. The development view may include one or more patterns. The user may identify one or more patterns through the development view at a glance. When the processor 120 receives the user selection input to the development view display object 240 in a state in which the development view is displayed, the processor 120 may select the development view not to be displayed. When the user interface receives the user selection input to the development view display object 240 in a state in which the development view display layer is displayed, the user interface may allow the development view display layer not to be displayed. In other words, the user input to the development view display object 240 may operate as a display/non-display switch for the development view.

The processor 120 may provide the design data item in the format of a downloadable file. The processor 120 may provide one or more design data items as a downloadable file in response to a download request of the user. The processor 120 may generate a data file acquired by organizing one or more design data items as a table, for example. For example, the processor 120 may provide one or more design data items in an Excel sheet format. The detailed description of the download is merely an example and the present disclosure is not limited thereto.

In above embodiments of the present disclosure, the garment data and the garment image are provided to enable the visual representation for the garment data selected by the user to be shown on the garment image, and therefore, facilitates identifying of a part within a virtual sample garment where the corresponding garment data is used. When the garment is generated, a process line of using fabric and cutting the fabric according to the pattern and a process line of attaching the supplemental material to the garment may be different from one other. A garment information providing method according to an exemplary embodiment of the present disclosure provides garment data corresponding to the pattern, the material, and the supplemental material in a different manner to enable the user to promptly determine only the part required in each process, and thereby reduces the amount of time required for the entire processes.

Figure 4:
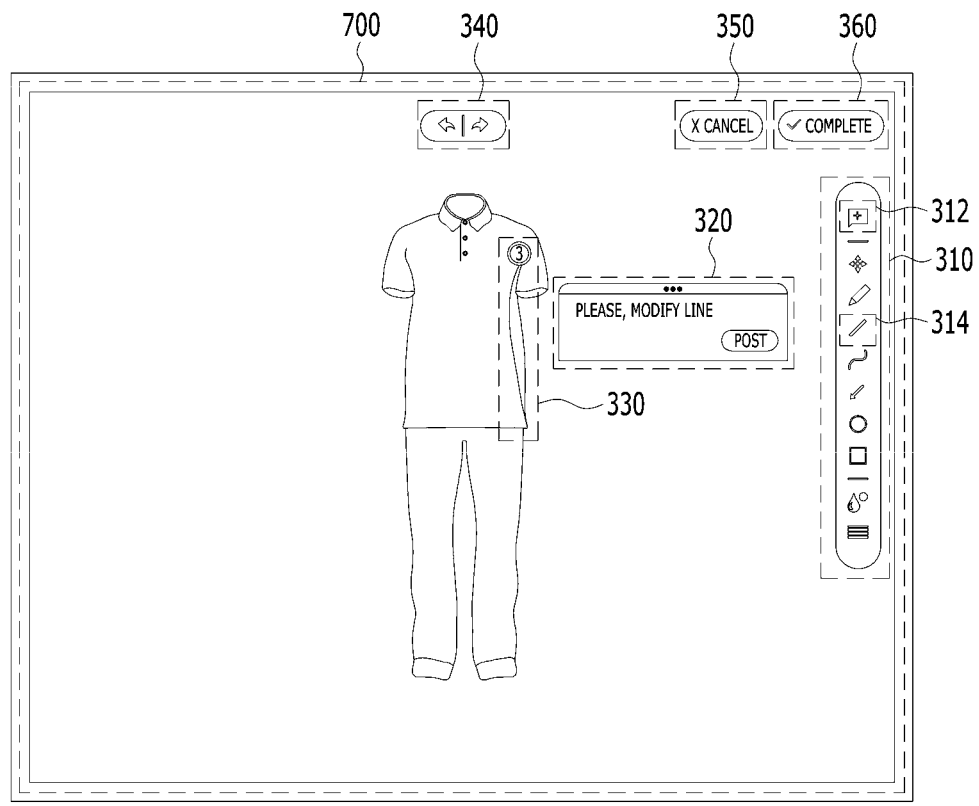
FIG. 4 is a user interface diagram illustrating an annotation layer overlaid on the design image layer, according to one embodiment of the present disclosure.

FIG. 4 is a user interface diagram illustrating an annotation layer 310 overlaid on the design image layer 700, according to one embodiment of the present disclosure. The processor 120 may display an annotation layer 310 in response to receiving the user selection input to the annotation input object 300. The user interface may further include an annotation layer 310 in response to the user selection input to the annotation input object 300. The processor 120 may additionally display the annotation layer 310 in order to allow a user annotation input for at least one of the design image or the design data items.

The annotation input may include additional data related to the design image or the design data items. The additional data is data intended by one user to deliver to other users with respect to the design image or the design data items. For example, the additional data may be a feedback, an attention and etc. for the design image or the design data items. When the designer delivers the design data items and the design image to the company, the company may deliver a feedback for a part to be modified through the annotation input. Alternatively, when the company delivers the design data items and the design image to a garment factory, the company may deliver an instruction to give extra caution to a specific part at the time of making the garment.

The annotation layer 310 may include one or more annotation objects allowing a user selection input to one or more annotation types. One or more annotation types may include an annotation for writing characters and an annotation for displaying a figure. The annotation layer 310 may include a character annotation object 312 for writing the character and a figure annotation object 314 for displaying the figure. The figure annotation object 314 may include, for example, a free curve annotation object, a straight line annotation object, a circle annotation object, an arrow annotation object, a square annotation object and the like. The annotation layer 310 may include a color selection object designating the color of the annotation object.

In response to receiving a user input to the annotation object included in the annotation layer 310 and a location where the annotation object is displayed, the processor 120 may display the annotation object at the corresponding location. In response to the user input to the annotation object included in the annotation layer 310 and the location, the design image layer 700 may further include the annotation object at the corresponding location. The processor 120 may receive a first user input to the annotation object included in the annotation layer 310. After the first user input, the processor 120 may receive a second user input for designating the location where the annotation object corresponding to the first user input is displayed. After the second user input, when the first user input is an input corresponding to a character annotation object 312, the processor 120 may receive a third user input for inputting the character. The processor 120 may display the annotation object corresponding to the first user input at a location corresponding to the second user input. The design image layer 700 may further include the annotation object corresponding to the first user input displayed at the location corresponding to the second user input. The second user input may be a different input according to the annotation object. For example, the second user input to a curve annotation object may be an input for designating a location for each of the starting point where a curve starts and an end point where the curve ends. The processor 120 may display the curve annotation object 330 corresponding to the second user input simultaneously with the design image. The design image layer 700 may further include the annotation object corresponding to the second user input displayed simultaneously with the design image. For example, the second user input to the character annotation object 312 may be an input for designating a location where the character annotation object (i.e., note) is displayed. A character corresponding to a third user input may be displayed in the character annotation object 320. The character annotation object 320 may include the character corresponding to the third user input.

The processor 120 may display an input deletion object 350 and an input completion object 360 for the annotation object. The design image layer 700 may further include the input deletion object 350 and the input completion object 360. The input deletion object 350 may be a display object for deleting the display of the annotation object. The input completion object 360 may be a display object for storing the display of a specific annotation object. A user or another user who inputs the corresponding annotation object may check the annotation object stored through the input completion object 360 again afterwards.

The processor 120 may display an input rewind object or revival object 340 for the annotation object. The design image layer 700 may include the input rewind object or revival object 340 for the annotation object. An input to a most recent input annotation object may be deleted according to a user selection input to the rewind object. Alternatively, an annotation object deleted according to rewind object may be generated again according to the user selection input to the rewind object.

The processor 120 may change and display at least one of: one or more design data items or design images to correspond to the user annotation input. At least one layer of the design image layer 700 or the selection layer 220 may include at least one of: the design image changed or the design data items changed to correspond to the user annotation input. The user annotation input may be an input for changing at least a part of the design image. The processor 120 may change and display at least a part of the design image using the user annotation input. The design image layer 700 may include the design image in which at least a part is changed to correspond to the user annotation input. For example, the user annotation input may be an input for an annotation object 330 for modifying a side curve line of the T-shirt. For example, the processor 10 identifies the input for the annotation object 330 and modifies the line of the T-shirt to display the design image. The design image layer 700 may further include the design image in which the input for the annotation object 330 is identified and the line of the T-shirt is at least partially modified. Alternatively, the processor 120 identifies the input for the annotation object 330 and modifies the measure of the T-shirt to display the design data items. The selection layer 220 may further include design data items modified by identifying the input for the annotation object 330.

The processor 120 may allow an annotation list layer to be additionally displayed in the user interface. The annotation list layer is disposed in one region of the user interface to display annotation information input by users. The annotation list layer may, for example, display the annotation information aligned in a time order in which the user performs the annotation input or display the annotation information aligned in an annotation order designated by the user. The processor 120 may receive a user selection input to the annotation information included in the annotation list layer. At least one of the design image layer 700 or the selection layer 220 may display annotation information corresponding to the user selection input in the annotation list layer.

Additional data is delivered to another user through the annotation input and as a result, efficient communication for the garment design may be conducted. The feedback delivered through a telephone or handwriting in the related art is directly displayed on the garment image and delivered online and as a result, the accuracy of feedback delivery may be enhanced.

Figure 5:
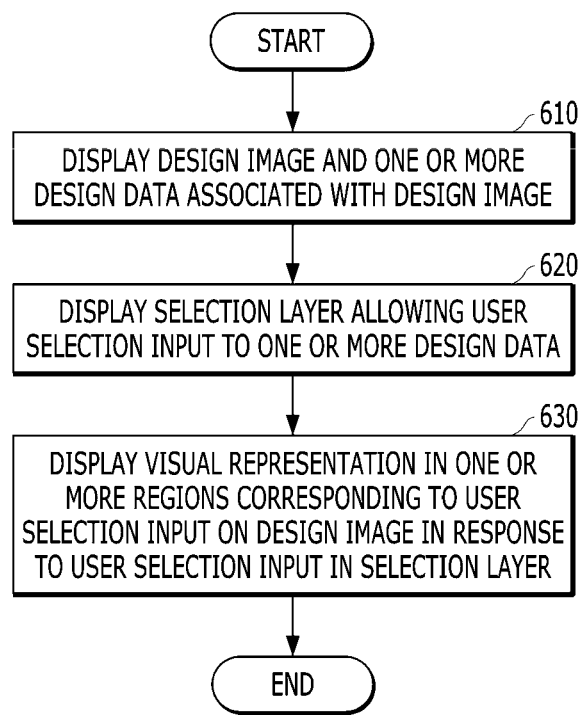
FIG. 5 is a flowchart for providing a user interface for displaying design information according to an exemplary embodiment of the present disclosure.

FIG. 5 is a flowchart for providing a user interface for displaying design information according to an exemplary embodiment of the present disclosure. A computing device 100 may display 610 a design image and one or more design data items associated with the design image. The design image may represent a three-dimensional object. The computing device 100 may adjust and additionally display at least one of: location, angle, or size of the design image displayed in response to receiving a user adjustment input to the design image.

The computing device 100 may additionally display a design image change layer allowing a user selection input to change a feature related to the design image. The computing device 100 may change and additionally display the feature of the design image in response to receiving the user selection input in the image change layer.

The computing device 100 may display 620 a selection layer allowing a user selection input to one or more design data items. The selection layer and a layer which display the design image may be of different layers. The selection layer may move independently of the layer where the design image is displayed in response to a user input.

The selection layer may include one or more category objects and include a category region allowing a user selection input to the category object and a design data region displaying one or more design data items corresponding to the category object according to a user selection input. The category object may include at least one of: a pattern category object, a material category object, a supplemental material category object, or a measure category object. The design data region may display at least one of: identification data identifying the one or more design data items or descriptive data describing the one or more design data items.

The computing device 100 may display 630 on the design image a visual representation in one or more regions corresponding to the user selection input in response to the user selection input in the selection layer.

The visual representation may include at least one of: the identification data identifying the design data item on the design image or sub design image data displaying a region corresponding to the design data item on the design image. The visual representation may display one or more regions of the design image corresponding to the user selection input in a manner different from other regions of the design image.

The computing device 100 may additionally display the annotation layer in order to allow a user annotation input for at least one of: the design image or the design data items. The annotation layer may include one or more annotation objects allowing a user to provide selection input to one or more annotation types. In response to receiving a user input to the annotation object included in the annotation layer and a location where the annotation object is to be displayed, the computing device 100 may additionally display the annotation object according to the user input at the corresponding location. The computing device 100 may change and additionally display at least one of: one or more design data items or design images to correspond to the user annotation input.

Figure 6:
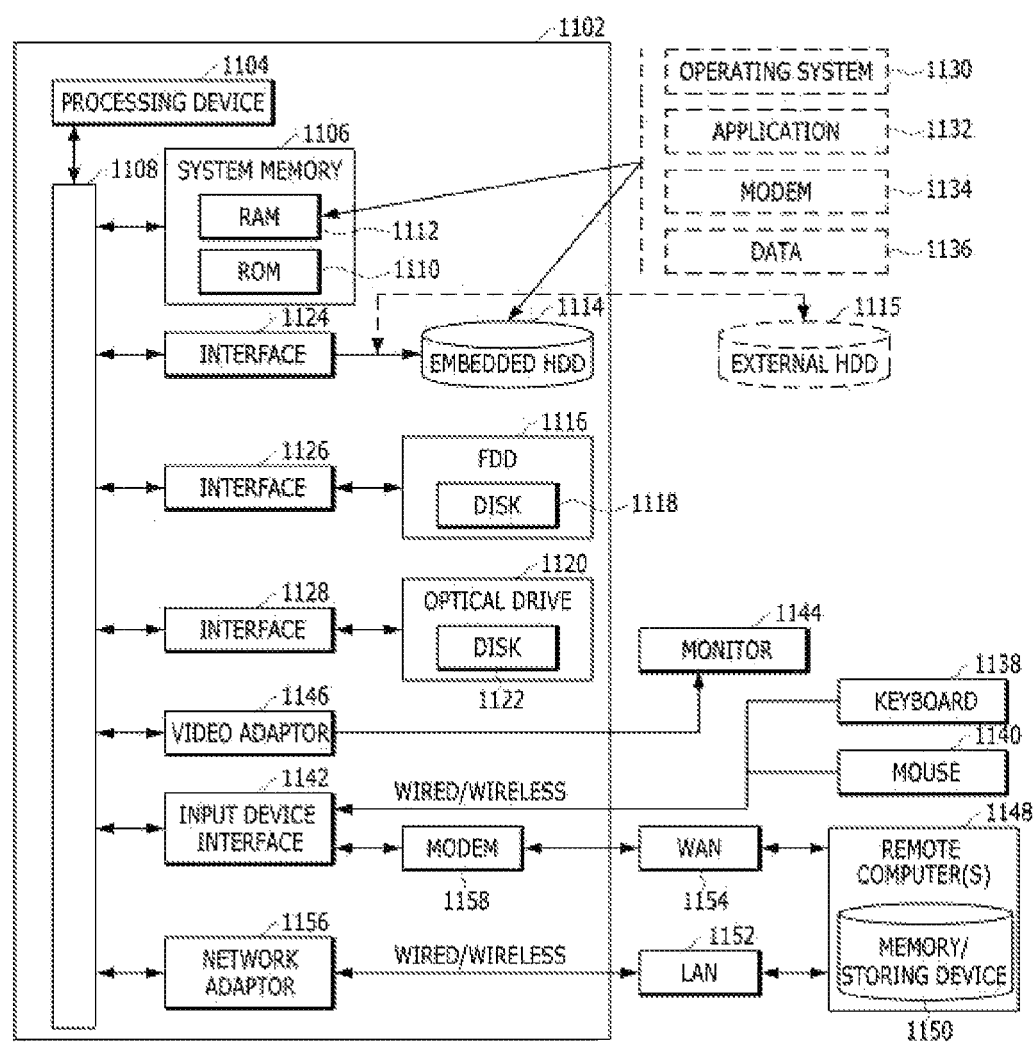
FIG. 6 is a block diagram of a computing device according to an exemplary embodiment of the present disclosure.

FIG. 6 is a block diagram of a computing device according to an exemplary embodiment of the present disclosure. FIG. 6 is a simple and normal schematic view of an exemplary computing environment in which the exemplary embodiments of the present disclosure may be implemented.

The present disclosure has generally been described above in association with a computer executable instruction which may be executed on one or more computers, but it can be implemented through a combination with other program modules and/or a combination of hardware and software.

In general, the program module includes a routine, a program, a component, a data structure and the like that execute a specific task or implement a specific abstract data type. Further, the method of the present disclosure can be implemented by other computer system configurations including a personal computer, a handheld computing device, microprocessor-based or programmable home appliances and others (the respective devices may operate in connection with one or more associated devices as well as a single-processor or multi-processor computer system, a mini computer, and a main frame computer).

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof. The computer readable media include volatile and non-volatile media, transitory and non-transitory media, and mobile and non-mobile media. As not a limit but an example, the computer readable media may include both computer readable storage media and computer readable transmission media. The computer readable storage media include volatile and non-volatile media, temporary and non-temporary media, and movable and non-movable media implemented by a predetermined method or technology for storing information such as a computer readable instruction, a data structure, a program module or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or other predetermined media which may be accessed by the computer or used to store desired information, but are not limited thereto.

The computer readable transmission media generally implement the computer readable command, the data structure, the program module or other data in a modulated data signal such as other transport mechanism and include all information transfer media. The term "modulated data signal" means a signal acquired by configuring or changing at least one characteristic of the signal so as to encode information in the signal. As not a limit but an example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown, and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM and the like, and the BIOS includes a basic routine that assists in transmitting information among components in the computer 1102 at a time such as in-starting. The RAM 1112 may also include a high-speed RAM including a static RAM for caching data and the like.

The computer 1102 also includes an internal hard disk drive (HDD) 1114 (for example, EIDE and SATA)—the internal hard disk drive (HDD) 1114 may also be configured for an external purpose in an appropriate chassis (not illustrated), a magnetic floppy disk drive (FDD) 1116 (for example, for reading from or writing in a mobile diskette 1118) and an optical disk drive 1120 (for example, for reading a CD-ROM disk 1122 or reading from or writing in other high-capacity optical media such as the DVD). The hard disk drive 1114, the magnetic disk drive 1116 and the optical disk drive 1120 may be connected to the system bus 1108 by a hard disk drive interface 1124, a magnetic disk drive interface 1126 and an optical drive interface 1128 respectively. An interface 1124 for implementing an exterior drive includes at least one of a universal serial bus (USB) and an IEEE 1394 interface technology or both of them.

The drives and the computer readable media associated therewith provide non-volatile storage of the data, data structure, computer executable instruction and others. In the case of the computer 1102, the drives and the media correspond to storing of predetermined data in an appropriate digital format. In the description of the computer readable media, the mobile optical media such as the HDD, the mobile magnetic disk and the CD or the DVD are mentioned, but it will be well appreciated by those skilled in the art that other types of media readable by the computer such as a zip drive, a magnetic cassette, a flash memory card, a cartridge and others may also be used in an exemplary operating environment and also, the predetermined media may include computer executable commands for executing the methods of the present disclosure.

Multiple program modules including an operating system 1130, one or more application programs 1132, other program module 1134 and program data 1136 may be stored in the drive and the RAM 1112. All or some of the operating system, the application, the module and/or the data may also be cached by the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch scene, and others. These and other input devices are often connected to the processing device 1104 through an input device interface 1142 connected to the system bus 1108, but may be connected by other interfaces including a parallel port, an IEEE 1394 serial port, a USB port, an IR interface and others.

A monitor 1144 or other types of display devices are also connected to the system bus 1108 through interfaces such as a video adapter 1146 and the like. In addition to the monitor 1144, the computer generally includes a speaker, a printer and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a microprocessor based entertainment apparatus, a peer device or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

Various modifications to the exemplary embodiments may be made. Generic principles defined herein may be applied to other embodiments without departing from the scope of the present disclosure. Therefore, the present disclosure is not limited to the exemplary embodiments presented herein.

What is claimed is:

1. A method of designing a garment, comprising:
    receiving one or more design files including an image of a virtual version of the garment, the garment including a plurality of regions and one or more items that form part of a physical version of the garment;
    displaying, in a design image layer, the image of the virtual version of the garment as specified in the one or more design files;
    displaying, in a selection layer, two or more design data items indicating types or configurations of the items at least in graphical representations, each of the design items indicating a pattern defining cutting of the part of the physical version, a material of the part of the physical version, a supplemental material associated with the part of the physical version, or a measure for the pattern, the graphical representations coinciding with the pattern, the material or the supplemental material as displayed in the design image layer;
    receiving a user selection input indicating selection of a subset of the items by a user; and
    updating the design image layer by highlighting one or more of the regions corresponding to the selected subset without modifying data corresponding to the subset of the items in the one or more design files, responsive to receiving the user selection input.

2. The method of claim 1, wherein the design image layer and the selection layer are different layers, and further comprising:
    moving the selection layer relative to the design image layer in response to a user movement input.

3. The method of claim 1, wherein at least a part of a region in the selection layer is overlaid on the design image layer in a transparent manner to render the design image layer visible.

4. The method of claim 1, further comprising
    displaying one or more categories of the items in a category region of the selection layer, wherein the user selection input identifies the one or more categories to select the items; and
    displaying the two or more design data items in a design data region of the selection layer.

5. The method of claim 4, wherein the category region and the design data region are displayed alongside each other.

6. The method of claim 4, wherein the category object includes at least one of a pattern category object, a material category object, a supplemental material category object, or a measure category object.

7. The method of claim 4, wherein the design data region displays identification data identifying the two or more design data items.

8. The method of claim 7, wherein the two or more design data items further comprise texts associated with the graphical representations.

9. The method of claim 7, wherein the identification data is displayed on the image of the virtual version of the garment.

10. The method of claim 9, wherein the identification data on the image of the virtual version of the garment is included in the design image layer.

11. The method of claim 1, wherein the one or more of the regions corresponding to the selected one or more of the items are less transparent compared to regions other than the one or more of the regions.

12. The method of claim 1, wherein an outline of the one or more regions corresponding to the selected one or more items are displayed.

13. The method of claim 1, wherein the one or more regions are displayed in a color different from regions other than the one or more regions.

14. The method of claim 1, further comprising:
displaying an annotation layer overlaid on the design image layer or the selection layer to enable the user to add one or more annotations on the displayed image of the virtual version of the garment or a design data item in the selection layer.

15. The method of claim 1, further comprising:
receiving a user adjustment input; and
changing a location, an angle, or a size of the image of the virtual version of the garment responsive to receiving the user adjustment input.

16. The method of claim 1, further comprising:
displaying a design image change layer overlaid on the design image layer;
receiving a user design input representing change of a feature related to the virtual version of the garment, and
updating the displayed image of the image of the virtual version of the garment responsive to receiving the user design input.

17. The method of claim 1, wherein the virtual version of the garment includes one or more sub-objects selectable by the user, and
further comprising:
receiving a sub-object user input selecting one of the one or more sub-objects; and
displaying one or more design data items corresponding to the selected sub-object in the selection layer.

18. The method claim 1, wherein a portion of the selection layer with annotation is displayed in a different manner compared to another portion of the selection layer without annotation.

19. The method of claim 1, further comprising
receiving an annotation input of a first user; and
receiving an annotation input of a second user corresponding to the annotation input of the first user.

20. The method of claim 19, wherein the annotation input comprises an additional data related to design image and design data.

21. The method of claim 20, wherein the additional data comprises content that the first user intends to deliver to the second user with respect to the design image or the design data.

22. The method of claim 20, wherein the additional data comprises at least one of feedback on the design image or the design data, an attention on the design image or the design data and an instruction to give extra caution to a specific part when making the garment.

23. A non-transitory computer readable storage medium storing instructions thereon, the instructions when executed by a processor cause the processor to:
receive one or more design files including an image of a virtual version of a garment, the garment including a plurality of regions and one or more items that form part of a physical version of the garment;
display, in a design image layer, the image of the virtual version of the garment as specified in the one or more design files;
display, in a selection layer, two or more design data items indicating types or configurations of the items at least in graphical representations, each of the design items indicating a pattern defining cutting of the part of the physical version, a material of the part of the physical version, a supplemental material associated with the part of the physical version, or a measure for the pattern, the graphical representations coinciding with the pattern, the material or the supplemental material as displayed in the design image layer;
receive a user selection input indicating selection of one or more of the items by a user; and
update the design image layer by highlighting one or more of the regions corresponding to the selected subset without modifying data corresponding to the subset of the items in the one or more design files, responsive to receiving the user selection input.

24. A computing device comprising:
a processor; and
a non-transitory memory storing instructions thereon, the instructions when executed by a processor cause the processor to:
receive one or more deign files including an image of a virtual version of a garment, the garment including a plurality of regions and one or more items that form part of a physical version of the garment;
display, in a design image layer, the image of the virtual version of the garment as specified in the one or more design files;
display, in a selection layer, two or more design data items indicating types or configurations of the items at least in graphical representations, each of the design items indicating a pattern defining cutting of the part of the physical version, a material of the part of the physical version, a supplemental material associated with the part of the physical version, or a measure for the pattern, the graphical representations coinciding with the pattern, the material, the supplemental material or the measure as displayed in the design image layer;
receive a user selection input indicating selection of a subset of the items by a user via a user input unit; and
updating the design image layer by highlighting one or more of the regions corresponding to the selected subset without modifying data corresponding to the subset of the items in the one or more design files, responsive to receiving the user selection input.

25. The computing device of claim 24, wherein the display screen is provided in a second computing device communicating with the computing device over a network.

* * * * *